US011520470B2

(12) United States Patent
Ziegenfuss et al.

(10) Patent No.: US 11,520,470 B2
(45) Date of Patent: Dec. 6, 2022

(54) USER INTERFACE FUNCTIONALITY FOR DIGITAL STANDARDS

(71) Applicants: SAE International, Warrendale, PA (US); COGNISTIC LLC, Pittsburgh, PA (US); Sigma Resources LLC, Pittsburgh, PA (US)

(72) Inventors: Audra Ziegenfuss, Baden, PA (US); Arijith S. Roy, Baden, PA (US); Michael David McCumber, Cranberry Township, PA (US); Uxue Zurutuza Dorronsoro, Pittsburgh, PA (US); Francis Carayol, Columbus, NM (US); Divyesh Gaur, Pittsburgh, PA (US); John Patrick Joseph McBride, Midway, PA (US)

(73) Assignee: SAE International, Warrendale, PA (US)

( * ) Notice: Subject to any disclaimer, the term of this patent is extended or adjusted under 35 U.S.C. 154(b) by 0 days.

(21) Appl. No.: 16/828,254

(22) Filed: Mar. 24, 2020

(65) Prior Publication Data

US 2021/0303138 A1    Sep. 30, 2021

(51) Int. Cl.
  *G06F 3/0484* (2022.01)
  *G06F 3/0482* (2013.01)
  (Continued)

(52) U.S. Cl.
  CPC ........ *G06F 3/04845* (2013.01); *G06F 3/0482* (2013.01); *G06F 3/0483* (2013.01);
  (Continued)

(58) Field of Classification Search
  CPC ............. G06F 3/04845; G06F 3/04817; G06F 3/0482; G06F 3/0483; G06F 3/0486; G06F 9/542
  See application file for complete search history.

(56) References Cited

U.S. PATENT DOCUMENTS 6,625,619 B1 * 9/2003 McClendon .......... G06F 16/954
7,117,163 B1    10/2006 Iyer et al.
(Continued)

OTHER PUBLICATIONS

"Snapshots from the ASTM website Standards and Publications", Mar. 4, 2020, URL: https://web.archive.org/web/20200304210139/ https://www.astm.org/Standard/standards-and-publications.html (Year: 2020).*

(Continued)

*Primary Examiner* — Sang H Kim
(74) *Attorney, Agent, or Firm* — Ference & Associates LLC; Gregory L. Bradley, Esq.

(57) ABSTRACT

One embodiment provides a method for graphically displaying and interacting with digital standards, the method including: displaying, on an interactive display, a digital standard interface display for displaying and interacting with information corresponding to at least one digital standard, wherein the digital standard interface display comprises a plurality of icons that are selectable by a user; wherein at least one of the plurality of icons comprises a standards category icon for displaying information related to digital standards within a category corresponding to the standards category icon; displaying a digital standard selection field in response to a user selection of one of the standards category icons; and displaying, responsive to a user providing input to the digital standard selection field, information related to a digital standard identified from the provided input and of the category type corresponding to the selected standards category icon. Other aspects are described and claimed.

20 Claims, 9 Drawing Sheets

(51) Int. Cl.
  *G06F 3/0481* (2022.01)
  *G06F 3/0483* (2013.01)
  *G06F 3/0486* (2013.01)
  *G06F 9/54* (2006.01)
  *G06F 3/04845* (2022.01)
  *G06F 3/04817* (2022.01)

(52) U.S. Cl.
  CPC ........ *G06F 3/0486* (2013.01); *G06F 3/04817* (2013.01); *G06F 9/542* (2013.01)

(56) References Cited

U.S. PATENT DOCUMENTS

| | | | |
|---|---|---|---|
| 7,949,691 B1* | 5/2011 | Franciscus de Heer | G06Q 30/0603 707/791 |
| 2005/0289158 A1* | 12/2005 | Weiss | G06F 16/217 |
| 2007/0180468 A1* | 8/2007 | Gill | G06F 21/10 348/E7.071 |
| 2010/0100457 A1* | 4/2010 | Rathod | G06Q 30/0623 705/26.1 |
| 2010/0262514 A1* | 10/2010 | Westphal | G06F 16/951 705/26.1 |
| 2011/0161182 A1* | 6/2011 | Racco | G06Q 30/06 705/14.73 |
| 2013/0060662 A1* | 3/2013 | Carlson | G06Q 30/06 705/26.61 |
| 2014/0006208 A1* | 1/2014 | Fuhge | G06Q 30/04 705/26.61 |
| 2014/0136549 A1 | 5/2014 | Surya et al. | |
| 2014/0143223 A1* | 5/2014 | Shi | G06F 16/33 707/706 |
| 2015/0082243 A1* | 3/2015 | Taylor | G07F 9/002 715/814 |
| 2016/0260152 A1* | 9/2016 | Lagoni | G06Q 30/0625 |

OTHER PUBLICATIONS

Anon: "Snapshots from the ASTM website Standards and Publications", Mar. 4, 2020, XP55820465, Retrieved from the Internet on Jul. 2, 2021. https://web.archive.org/web/20200304210139/https://www.astm.org/Standard/standards-and-publications.html.
Cohen, Benjamin, International Search Report for PCT/US2021/023437, dated Jul. 13, 2021, 4 pages.

* cited by examiner

FIG. 3

FIG. 5 ents tab corresponding to a digital standard of a materials
USER INTERFACE FUNCTIONALITY FOR DIGITAL STANDARDS

BACKGROUND

Standards are very important to many different industries. The use of standards ensures consistency across an industry regardless of the entity that is manufacturing, producing, maintaining, implementing, or otherwise interacting with the object or service that corresponds to the standard. For example, the transportation industry has standards that are related to materials and parts that are included within an automobile, airplane, helicopter, train, or other transportation vehicles. These standards may identify the properties (e.g., size, material, tensile strength, sheer force, tolerances, etc.) of each object within or making up the transportation vehicle (e.g., bolts, sheet metal, nuts, rivets, pistons, safety features, etc.). The standards are created by a governing body of the industry that then passes the standards onto the manufacturers, suppliers, assemblers, repairers, and other entities within the industry. Adherence to these standards is critical to ensuring consistency and safety across the industry. Alternatively, the standards may be internal standards that are developed by a company and are then expected to be adhered to throughout the company.

BRIEF SUMMARY

In summary, one aspect provides a method for graphically displaying and interacting with digital standards, the method comprising: displaying, on an interactive display, a digital standard interface display for displaying and interacting with information corresponding to at least one digital standard, wherein the digital standard interface display comprises a plurality of icons that are selectable by a user; wherein at least one of the plurality of icons comprises a standards category icon for displaying information related to digital standards within a category corresponding to the standards category icon; displaying a digital standard selection field in response to a user selection of one of the standards category icons; and displaying, responsive to a user providing input to the digital standard selection field, information related to a digital standard identified from the provided input and of the category type corresponding to the selected standards category icon.

Another aspect provides a system for graphically displaying and interacting with digital standards, comprising: one or more processors; a memory device that stores instructions executable by the processor to: display, on an interactive display, a digital standard interface display for displaying and interacting with information corresponding to at least one digital standard, wherein the digital standard interface display comprises a plurality of icons that are selectable by a user; wherein at least one of the plurality of icons comprises a standards category icon for displaying information related to digital standards within a category corresponding to the standards category icon; display a digital standard selection field in response to a user selection of one of the standards category icons; and display, responsive to a user providing input to the digital standard selection field, information related to a digital standard identified from the provided input and of the category type corresponding to the selected standards category icon.

A further aspect provides a product for graphically displaying and interacting with digital standards, comprising: a storage device that stores code, the code being executable by one or more processors and comprising: code that displays, on an interactive display, a digital standard interface display for displaying and interacting with information corresponding to at least one digital standard, wherein the digital standard interface display comprises a plurality of icons that are selectable by a user; wherein at least one of the plurality of icons comprises a standards category icon for displaying information related to digital standards within a category corresponding to the standards category icon; code that displays a digital standard selection field in response to a user selection of one of the standards category icons; and code that displays, responsive to a user providing input to the digital standard selection field, information related to a digital standard identified from the provided input and of the category type corresponding to the selected standards category icon.

Another aspect provides an apparatus for graphically displaying and interacting with digital standards, comprising: one or more processors; a display displaying an interactive display; a memory device that stores instructions executable by the processor to: display, on the interactive display, a digital standard interface display for displaying and interacting with information corresponding to at least one digital standard, wherein the digital standard interface display comprises a plurality of icons that are selectable by a user; wherein at least one of the plurality of icons comprises a standards category icon for displaying information related to digital standards within a category corresponding to the standards category icon; display a digital standard selection field in response to a user selection of one of the standards category icons; and display, responsive to a user providing input to the digital standard selection field, information related to a digital standard identified from the provided input and of the category type corresponding to the selected standards category icon.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example user interface of a requirements tab corresponding to a digital standard of a materials category.

FIG. 5 illustrates an example aggregated table within a properties tab corresponding to a digital standard of a materials category.

DETAILED DESCRIPTION

Figure 1:
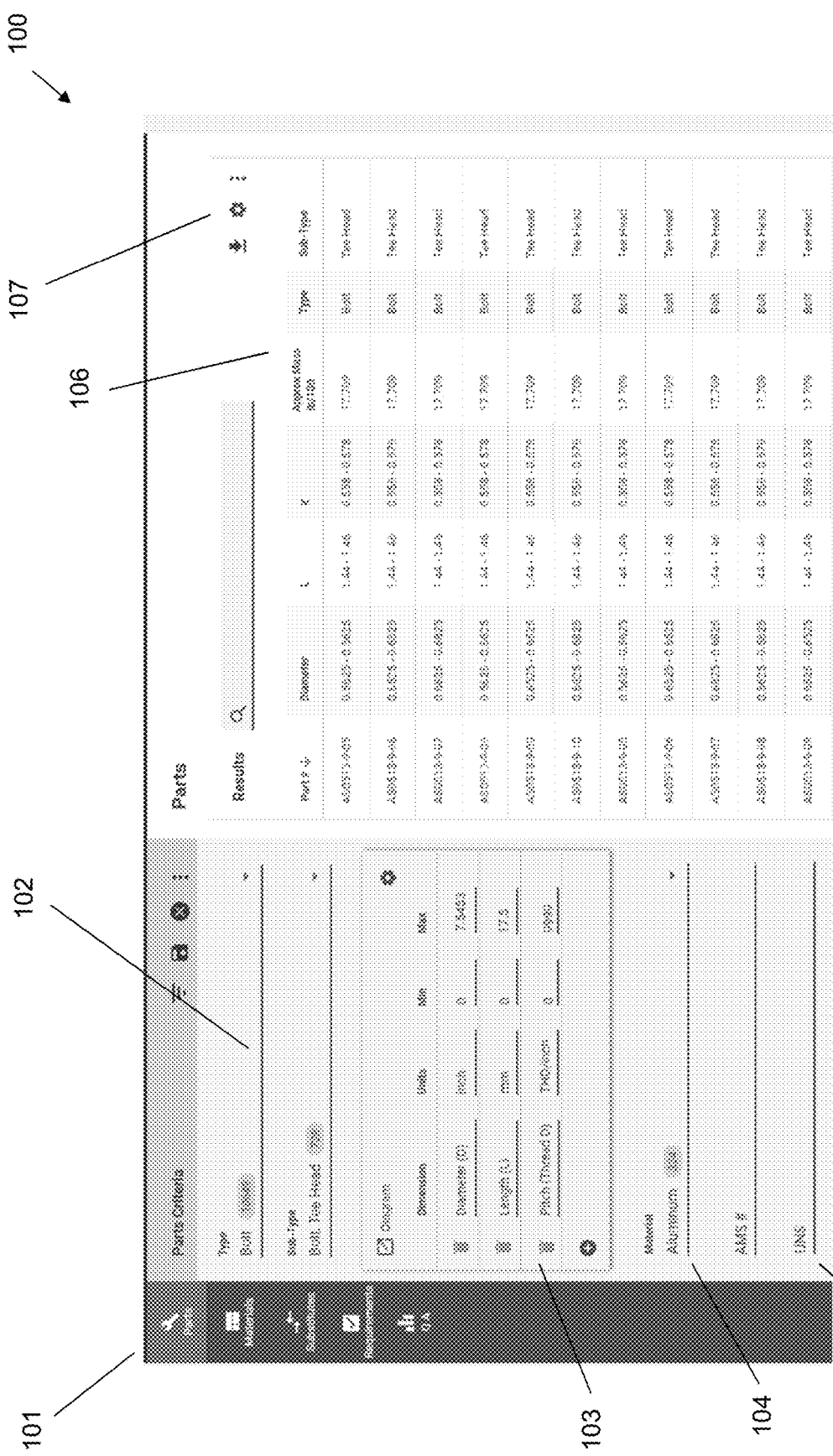
FIG. 1 illustrates an example user interface for displaying and interacting with digital standards.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Standards for industries (e.g., transportation, energy, manufacturing, engineering, etc.) are very complex and extensive. Governing bodies, including internal company governing bodies, that create the standards typically spend significant amounts of time, for example, years, presenting, revising, and adopting a single standard. Since the standards document includes multiple requirements and data specific to a part, material, process, management approach, or the like, for global industry or companywide adoption, the length of time to create the standards document is quite significant. Once the standards document is created, it is available to any applicable entity to make sure that the consistency and adherence to the standards is maintained throughout an industry, company, or other entity. Typically, the standards document is a paper document or pdf. When revisions to a standard are introduced, the standard is updated with a revised document which supersedes the earlier version. These revisions then have to be available to any applicable entity.

With the increase in technology, distribution of the standards documents and revisions has become easier since they can be provided on a technological platform (e.g., server, Internet website, data storage location, etc.) that can then be accessed by anyone who wants or needs access to the standards document. However, as with the paper or pdf versions of the standards, this technique of merely uploading or saving the standards and revisions to a data repository has some drawbacks, particularly for those users within the industry that need to access and implement the standards.

One problem with this technique is that while the standards are now in an electronic form (i.e., pdf), that electronic format is effectively similar to the paper copies in that they cannot be searched and finding information related to a particular part, requirement, specification, material, regulation, standard or the like, is time extensive. While some conventional techniques allow for conversion of the electronic version of the standard to a searchable format, for example, through optical character recognition, this merely slightly reduces the amount of time it takes to find target information. In this case, the user must select a search term that will result in the desired information. Additionally, since the format of the standards from paper to electronic form remain largely unchanged, even if converted to a searchable format, it is still difficult to find target information.

One approach to solving this problem has been to convert the paper standards to a digital standard using rules to classify different aspects of the standard, for example, requirements and sections. However, this is not an accurate conversion since many of the terms that designate different aspects of the standard are not uniform, thereby leading to portions missing from a designated aspect. Additionally, because this technique is fairly simple and rudimentary, a user interface for displaying and interacting with the standard is missing or, at best, allows for a keyword search much like the conversion of the paper standard to the electronic format utilizing text recognition techniques.

Accordingly, an embodiment provides a method for graphically displaying and interacting with digital standards. The term "digital standard" as used herein is more than a simple conversion of the paper standards to a digital format, for example, by saving it in a digital format or even converting it to a searchable format, for example, by using text recognition techniques. Rather, the term "digital standard" refers to not only the conversion of the paper standard to an electronic format, but more specifically, the data structure and data model describing the interaction and relationships among different aspects within a given standard, between a given standard and other standards, and between a given standard and other documents, applications, and/or data sources. Furthermore, when an application is built which accesses data from the data stores just described, the digital format adds functionality to the standard that allows for users within an industry to view information for a particular part, material, standard, requirement, regulation, or the like, in a display where the user can interact with the information to identify sources of the information, view sections, data, and requirements of a standard, find related information, and the like. In other words, "digital standards" refers to not only the digitization of the paper standard, but also the digital layout, data model and schema, and digital functionality included with the digitization of the standard.

Using the digital standard described herein, a user can not only provide search criteria related to content within the data stores or related data stores and receive the information related to the provided search criteria, but the user can also find similar parts, regulations, materials, or the like, receive alerts related to changes in the information, interact with the information to identify sources of the information, identify statuses of the underlying information sources, filter returned search results, and easily locate necessary information, for example, requirements, and context related to that information, all in an intuitive display and user interface. Thus, such a system provides a technical improvement to the current electronic format of paper standards by providing additional functionality and data structure with respect to the standard that is not provided by or within current solutions.

The illustrated example embodiments will be best understood by reference to the figures. The following description is intended only by way of example, and simply illustrates certain example embodiments.

The described system provides a user interface that allows for graphically displaying and interacting with digital standards. The paper and/or pdf standards are converted to an electronic format and then analyzed and processed to convert the information included within the standard to a format that is easily understood by a user interacting with the system, while maintaining the integrity of the standard. In other words, the system does not paraphrase or alter the text of the paper and/or pdf standard in any way. Rather, the system displays the standard in a way that is intuitive to a user and that allows for quickly locating information of interest to the user. The system also allows for interacting with the digital standard so that the user can locate target information. For example, the user can provide search terms and filters for locating parts, materials, regulations, or the like, within the standard. The display will then return the results and, based upon a user selecting one of the results, the system will provide additional information that is taken from the standard corresponding to the selected result.

For ease of readability, a few terms will be defined for consistency. However, it should be understood that these definitions are not intended to limit the scope of the described system and method. The term "digital standard" will refer to the data structure and data models by which information from a given standard is structure and the information that is provided when a user selects content within the data stores or related data stores for viewing. This includes all the information included across the tabs and different windows corresponding to the selected object.

The term "underlying standard" will refer to the paper or electronic version of the standard. In other words, the term underlying standard refers to the standard that is issued by the governing body associated with the standard document. The term underlying standard also includes revisions to the standard.

The term "governing body" will refer to the entity that issues the underlying standard. This can be a governing body of an entire industry, for example, the transportation, energy, engineering, or the like, industry. Governing body may also refer to an internal governing body, for example, a group or individual within a company that creates and/or issues standards to be utilized within the company or other entity.

The term "aspect" will refer to a section or portion of the digital standard, with each section or portion providing information corresponding to the aspect. Within the user interface, the digital standard may be presented in multiple tabs with each corresponding to a different aspect of the digital standard. Example aspects include composition, properties, sections, requirements, revision history, and the like.

The term "object" will refer to a thing that a user is attempting to locate information for. An object may be any material, part, regulation, standard, specification, or the like, that has a corresponding digital standard. Thus, the term "object" may not only refer to physical things but may also refer to groups of words or digital things, for example, regulations, standards, or data. The term "object" may also refer to a thing made up of other objects. For example, the term "object" refers to both a single bolt and an entire automobile.

An "attribute" refers to a property of an object. The object property may be a physical property, for example, size, pitch, material, or the like. The object property may also be an inherent property, for example, sheer force value, heat resistance value, water resistance value, impact rating, load rating, or the like. The object property may also be a manufacturing property, for example, manufacturing technique (e.g., naturally aged, heat treated, etc.), plating types, or the like. The object property may also be a performance property, for example, typical application, typical cycle time, number of cycles per minute, fluid displacement amount, or the like. Essentially the object property may be any property that is used to identify, utilize, manufacture, or distinguish the object.

A "category type" or "standards category" refers to an overarching category of objects or standards types. For example, an object may be a particular bolt, and the category type may be Parts. As another example, an object may be Non-Ferrous Alloys, and the category type may be Materials Standards or Metals.

A "user" refers to a person or entity interfacing with the user interface and digital standard. The term "user" does not necessarily refer to a specific person and may refer to an entire entity and those people within the entity that can access the user interface. For example, a manufacturer of an object is an entity and will be referred to as a user. However, it should be understood that different people within the entity can access and utilize the described system and method.

The described system provides a user interface that allows a user to view and interact with digital standards. The user interface may be displayed on a display device, for example, a computer monitor, display of a portable information handling device (e.g., laptop computer, tablet, smartphone, cellular phone, personal digital assistant, smart watch, augmented reality display, virtual reality display, etc.), a projector screen, a television display, a smart board, or the like. The user interface may be displayed in response to a user accessing an information handling device where the described system has been installed locally on the device. Additionally, or alternatively, the user interface may be displayed in response to a user accessing a data repository (e.g., cloud computing environment, remote data storage location, network data storage location, a storage location corresponding to a publishing entity, distributed system, etc.) that stores the described system or a portion of the system. For example, a user may access a web application for the user interface, which then communicates with a server of the publishing entity while the database is housed on a wholly separate remote server. As another example, a user may access a data storage repository with user credentials which then displays the user interface.

The system may provide some functionality locally, for example, on the device used and accessed by the user, and may additionally provide some functionality remotely, for example, within a data repository. For example, the system may download some information to be saved locally with respect to the user, for example, user saved searches, user alerts, a skeleton of the user interface, and the like. The system may also access the data repository for other information, for example, the information corresponding to a digital standard. The system may also interact with other relational databases locally or remotely hosted, which may be based upon what the user has access to, as described in more detail herein.

FIG. 1 illustrates an example user interface 100 for displaying and interacting with information corresponding to digital standards. The display 100 may correspond to a type of "home" screen for a particular category type, in this example, a parts category type. The display provides a plurality of icons that are selectable by the user 101. The example icons 101 shown in FIG. 1, are a "home" icon represented by the house icon, a parts icon, a materials icon, a substitutes icon, and a requirements icon. As should be understood, the number of icons and names of the icons can vary. Additionally, the layout or location of the icons can vary. Further, an icon does not have to be a graphical representation; rather, the icon can simply be a word or text with no image or graphical representation. The display may also provide other icons 107 that allow a user to access other information, for example, alerts set by the user, saved searches corresponding to the user, tools related to the user interface, help for assistance with the user interface or information contained therein, and the like.

At least one of the icons 101 corresponds to a standards category icon that displays information related to a digital standard within the category that corresponds to the icon. As an example, in FIG. 1, both the parts icon and the materials icon correspond to standards category icons. If the parts icon is selected, then digital standards corresponding to parts are searchable and/or displayed. If the materials icon is selected, then digital standards corresponding to materials are searchable and/or displayed. Thus, other possible standards category icons may include a regulation icon, specification icon, object icon, and the like. This list is not exhaustive and is only used for illustrative purposes only. In the example of FIG. 1, a user has selected the parts icon.

In response to a user selecting one of the standards category icons the user interface displays a digital selection field 102. In the provided example, the selection field 102 is a drop down menu where the user selects the field and a drop down menu is provided where the user can select from different objects included in the menu. However, other formats for the selection field 102 are possible, for example, a text field where the user provides text for searching for an object, a series of radial buttons where the user can select different options with the radial buttons to identify an object, or the like. In the example of FIG. 1, the user has selected "Bolt 10649".

Upon selection of an object, the user interface may display other input areas 103. Whether other input areas are provided and the information within the other input areas may be based upon the object selected. In this example, another input area 103 has been provided that includes information related to attributes of the object, in this case, diameter, length, and pitch. In the example, this other input area 103 also includes identification information for the attributes, for example, the units. The user can further limit the search for an object using the other input area 103. For example, the user may provide input into the input area that filters results that would be returned from the selection field 102.

Similar to the other input area 103, the system may display other filters or constraint input areas 104. In this example, the user can limit the object to a particular material type in the filter input area 104. Similar to the other input area 103, whether the filter input area 104 is displayed or the possible filters that are provided may be based upon the object that is provided within the selection field 102. The user interface may also provide selectable elements or fillable fields for advanced filtering or searching 105. Selection of this selectable element may allow the user to provide even more information to further narrow the search. Once the user is satisfied with the provided information, the user can select a search selectable element, or alternatively and as illustrated in the example of FIG. 1, the search results 106 may be automatically populated. The search results display information related to a digital standard that is identified from the provided input. In the event that more than one object fulfills the provided input, the user may be presented with a display that allows the user to select a particular object. This display may also provide other functionality, for example, the ability to sort the objects by attributes, the ability to filter objects by attributes, and the like, for example, as shown in FIG. 1 in the search results 106.

Figure 2:
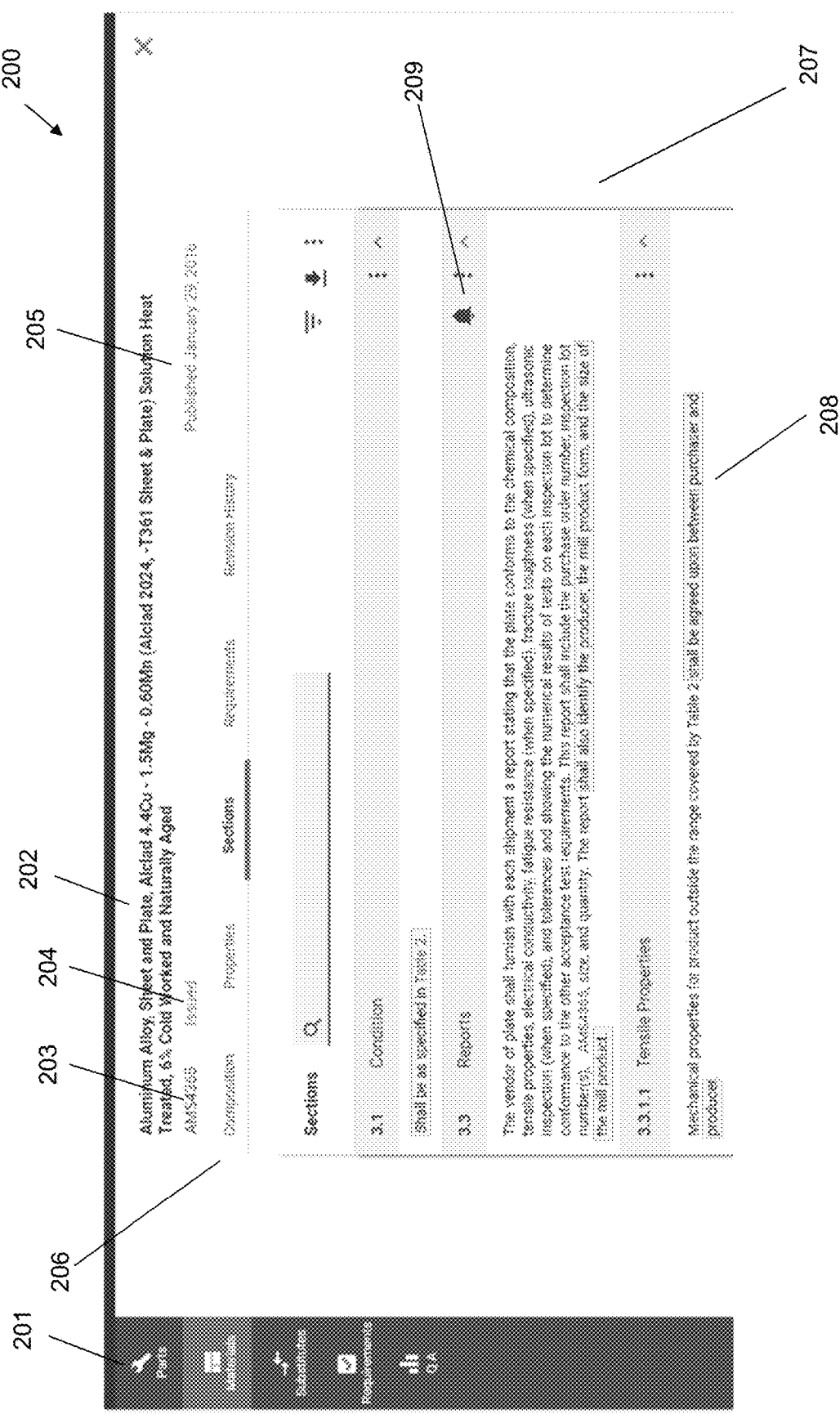
FIG. 2 illustrates an example user interface of a sections tab corresponding to a digital standard of a materials category.

FIG. 2 illustrates an example digital standard display 200 to one of the tabs within the digital standard. The digital standard display 200 provides a plurality of icons 201 that may be similar to some of the icons 101 included in the home screen 100, that allows a user to transition between different user interface displays without having to go back to the home screen. The digital standard display 200 provides information that is extracted from the paper standard that corresponds to the selected object. A description of the selected object 202 is provided. This description 202 may be a detailed description, as illustrated in FIG. 2, including details regarding different attributes of the selected object. Alternatively, the description 202 may be a simpler description, excluding some of the attribute details.

The digital standard display 200 also provides information related to the underlying standard document. For example, the digital standard display 200 provides information identifying the standard identifier 203 that applies to the selected object. This identifies the name, or other identification information, that corresponds to the underlying standard document that is applicable to the selected object. The digital standard display 200 also provides a status 204 of the underlying standard. In this example, the status is issued indicating that the standard has been issued. Other statuses may be reaffirmed, cancelled, revised, pending, or the like. The digital standard display 200 may also identify when the latest version of the underlying standard was published 205. In this example, the standard has not been revised, so the latest version is identified as published with a publication date. In the case that a standard has been revised, the latest version may be identified as revised with a publication date of the revision.

The system may also provide some functionality to interact with this information. Using the latest version example, the system may allow a user to hover over the Revision History area 205 or select the latest version area 205, and the user may be presented with a history of versions and publication dates. Using the standard identifier 203 as another example, the system may provide functionality for the user to select the standard identifier 203 and be presented with the underlying standards document.

Figure 3:
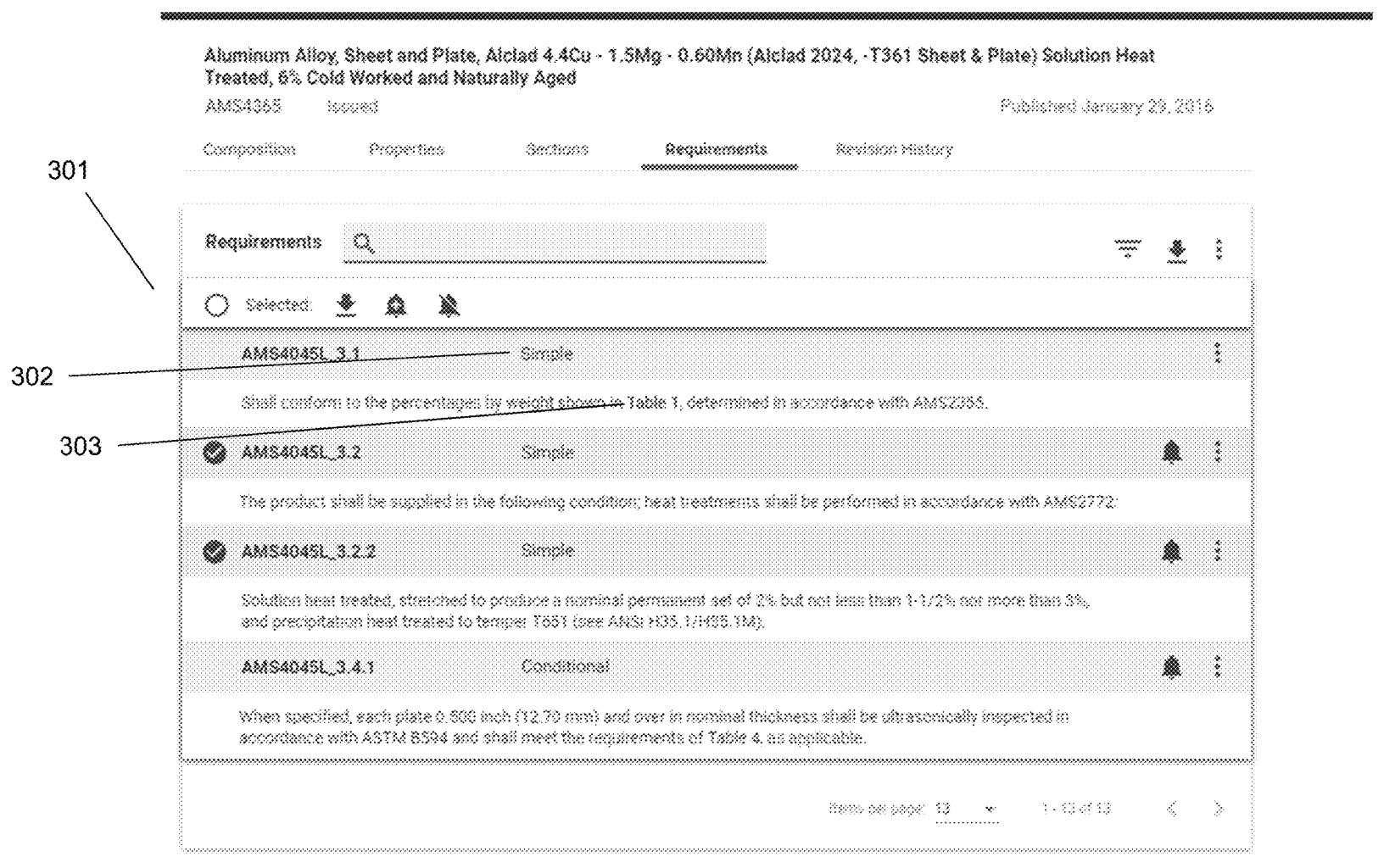
Figure 6:
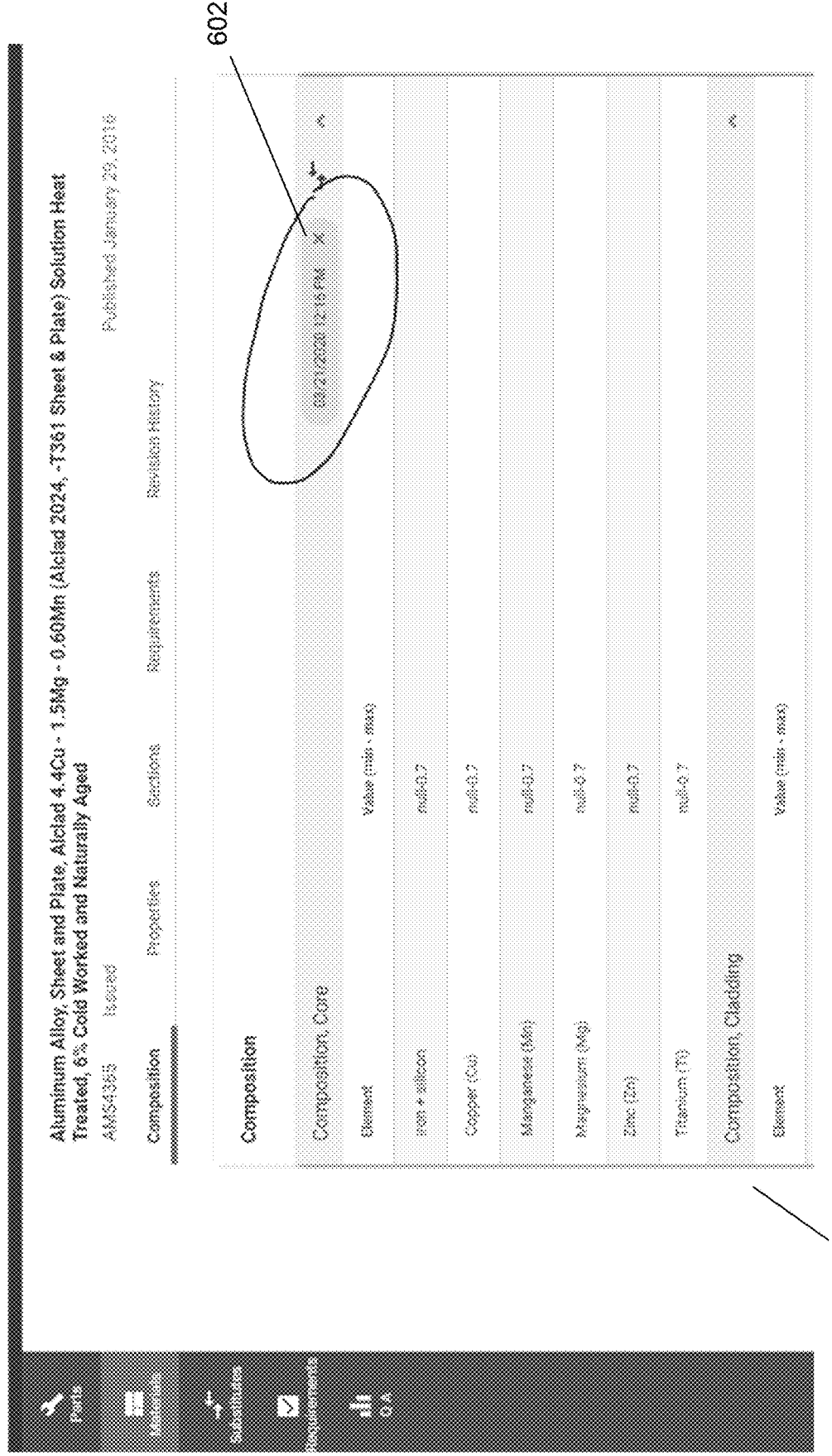
FIG. 6 illustrates an example revision history within a composition tab corresponding to a digital standard of a materials category.

The digital standard display 200 provides a plurality of tabs 206 that correspond to different aspects of the digital standard. In the example of FIG. 2, the tabs 206 include composition, properties, sections, requirements, and revision history. The composition tab may provide information related to the composition of a selected object, for example, different elements within the object, different elements associated with different parts of the object, and the like. An example composition tab view is illustrated in FIG. 6. The properties tab may provide information related to different properties or attributes of the selected object. An example properties tab view is illustrated in FIG. 5. The sections tab, an example of which is illustrated in FIG. 2, may provide information related to sections of the underlying standard that are applicable to the object. The requirements tab may provide information related to requirements from the underlying standard that are applicable to the object. An example requirements tab view is illustrated in FIG. 3. The revision history tab may provide information related to different revisions of the standard or portions of the standard. It may also provide information related to what was revised, the revision date, when the revision was put into effect, and the like.

In the example of FIG. 2, the sections tab is selected. The sections tab provides information related to sections of the underlying standard that are applicable to the object. As can be seen in FIG. 2, the information from the different sections is provided as found within the underlying standard. However, the format of the information may be different than found in the underlying standard. For example, the sections may be divided differently, formatted differently, or the like, as compared to the underlying standard. However, the purpose of the digital standard is to maintain the information provided in the underlying standard. Thus, the information included within the sections tab is the same as the underlying standard, barring any transcription or conversion errors that may occur. As can also be seen in the example of FIG. 2, the sections include the headings and other information corresponding to the section of the underlying standard. This allows a user to capture the context of the section and to be able to identify where in the underlying standard the section was taken from.

The functionality illustrated and discussed with respect to the section tab below is not unique to the sections tab and may apply to other tabs. For example, the alert functionality may also be contained within requirements tab, thereby allowing the user to set alerts with respect to a requirement. As another example, the filtering and sorting functionality may apply to the properties tab. In other words, each of the tabs may include some or all of the functionality described with respect to the sections tab or any of the remaining tabs.

The sections tab may also allow for some manipulation functionality. For example, the sections tab includes functionality that allows a user to minimize different sections so that only the sections the user wants to view are visible. The sections tab also includes functionality allow the user to sort or filter the different sections. The sections tab also includes functionality for the user to select different sections and export the selected sections to another application, for example, a word processing document, a spreadsheet, a database, or the like. Also illustrated in FIG. 2 is functionality for highlighting certain portions within the sections 208. In this example, requirements included within the sections are highlighted. By highlighting the requirements within the section, the user can get context for the requirement, but is also alerted or drawn to a requirement so that it is not overlooked. There is some additional functionality that will be explained with respect to FIG. 3.

The sections tab may also allow for some user-specific functionality. For example, the user may use the alert feature to set an alert 209 for a particular section. The alert feature is used to alert the user when a change occurs to the section that the alert is set for. For example, in FIG. 2, a user has set an alert for section 3.3—Reports. If any of the information within this section is changed, for example, due to a revision of the section, the user will be alerted that the section has changed. The alert may also identify what change was made to the information and the source of the change (e.g., change by governing body, change within the standard itself, change with the data repository, change caused by transcription or conversion error, etc.). If the user has other relational databases, as discussed in connection with FIG. 8, connected to the digital standards database, the alert functionality may also provide an indication of downstream documents or objects that may include or rely on the section, requirement, or other information that was changed.

FIG. 3 illustrates an example requirements tab display 301. The requirements tab displays information corresponding to requirements that are applicable to the selected object. It also provides additional information with respect to the identified requirements where applicable. For example, the system may designate the type or category 302 of or corresponding to the requirement, for example, simple, conditional, recommendations, or the like. This provides a user with a context for the requirement and whether additional information needs to be identified to ensure the requirement is implemented properly. To provide additional context, the user may also select the requirement and will be presented with the section display with the section corresponding to the requirement as the focus section. This allows the user to read the requirement in context.

The requirements tab is also used to illustrate the hyperlinked selectable elements functionality. The system also provides the functionality of hyperlinks for selectable elements within a portion. For example, "Table 1" 303 is hyperlinked as a selectable element. If a user selects this selectable element, the user is presented with the portion of the standard corresponding to the selectable element. This presentation may come in different forms, for example, switching to the display that includes the hyperlinked portion, a pop-up window, an overlay window as illustrated in FIG. 4, or the like.

Figure 4A:
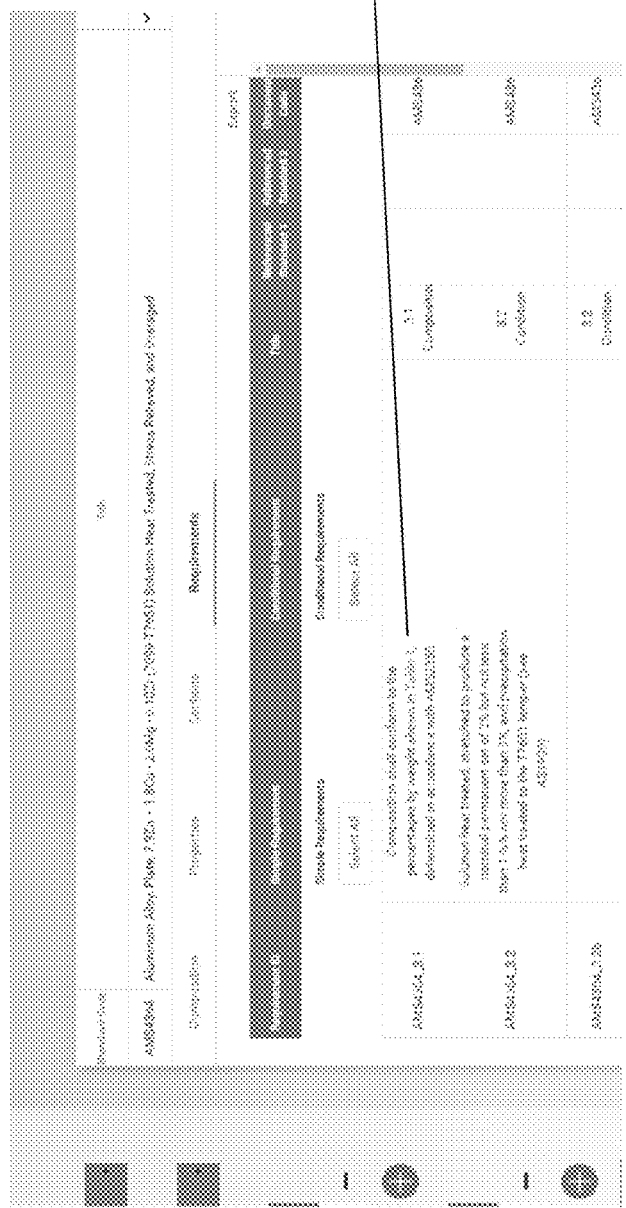
FIG. 4A illustrates an example tab display with selectable element before a table overlay.
Figure 4B:
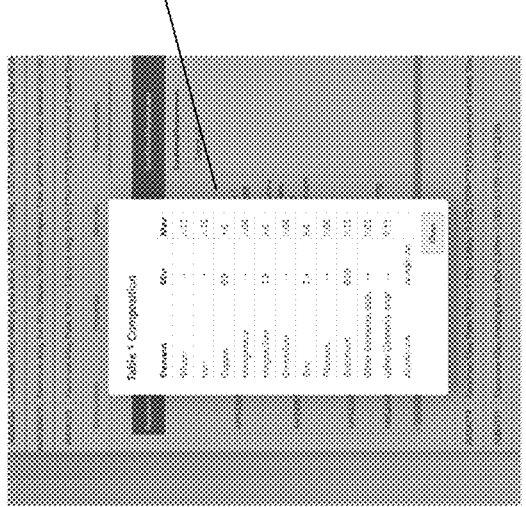
FIG. 4B illustrates an example table overlay displayed when interacting with a hyperlinked selectable element.

FIG. 4 illustrates an example selectable element overlay. In this case, the user has selected the selectable element corresponding to Table 1 402. It should be noted that the requirements tab illustrated in FIG. 4A has a different layout than the requirements tab illustrated in FIG. 3. It should be noted that different formats and layouts of the information within each tab are contemplated and possible. When the user selects the selectable element 402 in a tab display FIG. 4A an overlay window 401 is presented over the tab display as shown in FIG. 4B.

FIG. 5 illustrates an example properties tab. The properties tab provides information related to different properties or attributes of the object. The properties illustrated in FIG. 5 are merely a subset of all of the properties corresponding to the selected object. The properties tab is used to illustrate the aggregate table functionality. The properties tab may be illustrated in table form 501, as shown in FIG. 5. Different properties may have different rows, columns, and numbers of rows and columns. Since an underlying standard may have many different tables that apply to a particular object, the described system attempts to aggregate all information corresponding to a single property into a single aggregate table so that the user is presented with the information in a concise manner.

For example, the Tensile Strength column and corresponding information 502 of the table illustrated in FIG. 5, may have come from one portion of the underlying specification, whereas the Yield Strength column and corresponding information 503 may have come from another portion of the underlying specification. In other words, the aggregate table may include an aggregation of information from multiple table sources within the underlying standard. The described system has the ability to aggregate this information into a single table. Additionally, the system is able to ensure that units and other classifiers of the information are correctly annotated within the aggregated table.

FIG. 6 illustrates an example composition tab. The composition tab displays information related to a molecular, elemental, or compositional structure of the object 601. In other words, the composition tab displays information that is related to the material make-up or structure of the object. The composition tab also has visual elements to illustrate the revision history functionality. Each portion of the digital standard may include a revision history 602. The revision history of the table identifies when the last revision, since the standard was released into the system, was implemented and may also identify the source of the revision. For example, the source may be the entity providing the digital standard system, a quality engineer, or the like. The revision history provides a user with information regarding when a table revision was implemented so the user knows what objects or materials that refer to the underlying standard need to be modified or updated to reflect the new standard.

As mentioned before, the functionality discussed with respect to a particular tab is not unique to that tab unless specifically stated. Instead, different tabs were used to illustrate different functionality for ease of illustration and not to limit that functionality to a particular tab. All tabs included in the digital standard display 200 may include some or all of any of the discussed tab functionality.

Figure 7:
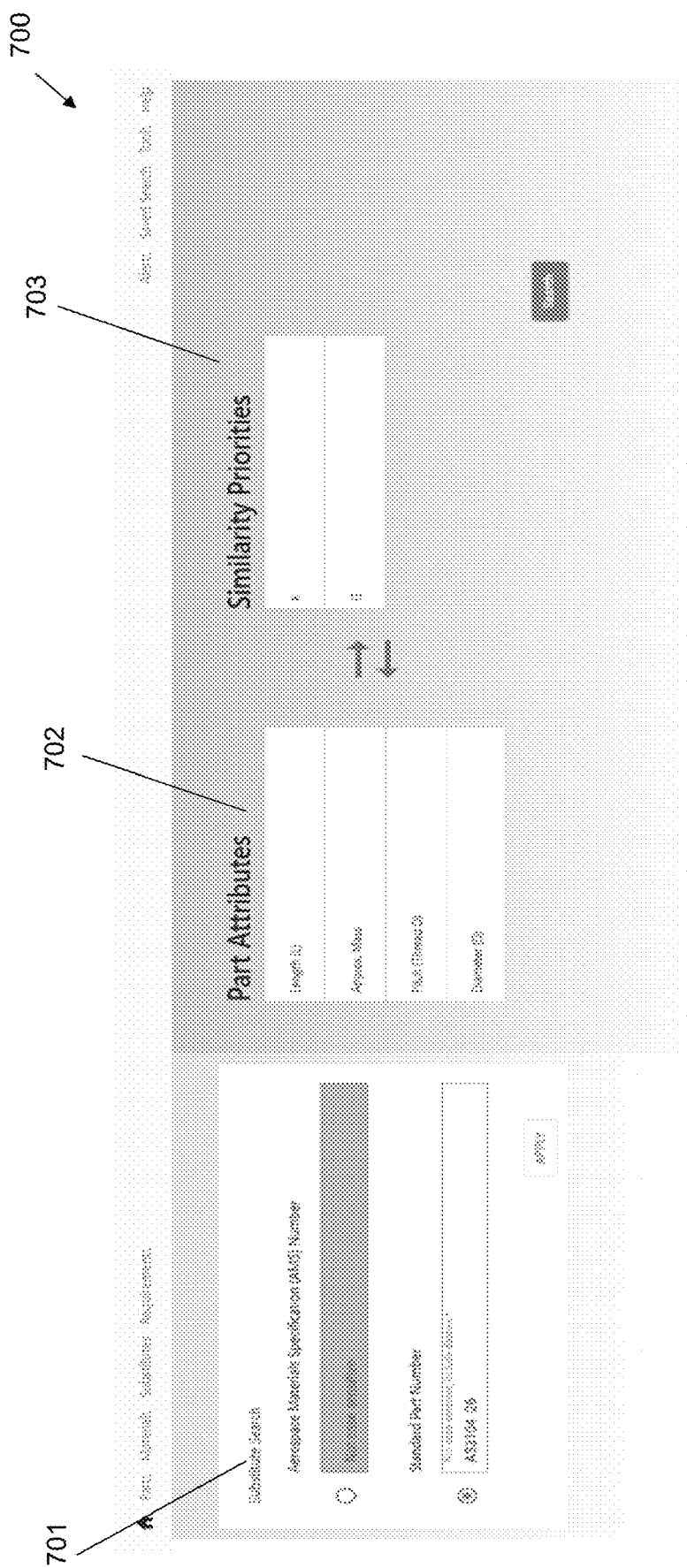
FIG. 7 illustrates an example substitute search.

FIGS. 2-6 discussed displays associated with a particular digital standard. FIG. 7 illustrates a user interface that can be used to search for a digital standard using a substitution search. In this type of search, the user is not looking for a predetermined object. Rather, the user is looking for an object that can be used as a replacement for a predetermined object. The substitute search display 700 provides a search box 701. The search box 701 illustrated in FIG. 7 shows two different radial buttons that a user can select to provide input for searching. Different layouts or numbers of search options are contemplated and possible. In this example, the user has selected the Standard Part Number search radial button. The user has also provided input to the field associated with the Standard Part Number search. This provided input may be the predetermined object number, or the object that the user is looking for a replacement or substitute to. The provided input may correspond to the digital standard identifier associated with that object.

Once the part number is provided, the system populates a table of attributes 702 that are associated with that part number. Thus, the types and number of attributes may be different for each part. The user can then drag-and-drop part attributes to the similarity priorities area 703. In this case, attributes "K" and "G" were moved from the table of attributes 702 area to the similarity priority area 703. The user may order these attributes within the similarity priority area 703 based upon what attribute should be given the highest priority when searching for a substitute part. In this case, the "K" attribute will be given the highest priority. Once the user selects the search icon, the user will be presented with a table of objects that have similarities to the predetermined object. These will be sorted based upon the similarity priorities provided by the user. The user can also manipulate the displayed information, for example, by sorting and filtering on different attributes. An object within the search results can then be selected to access one of the displays described in FIG. 2-6.

Figures 8A, 8B:
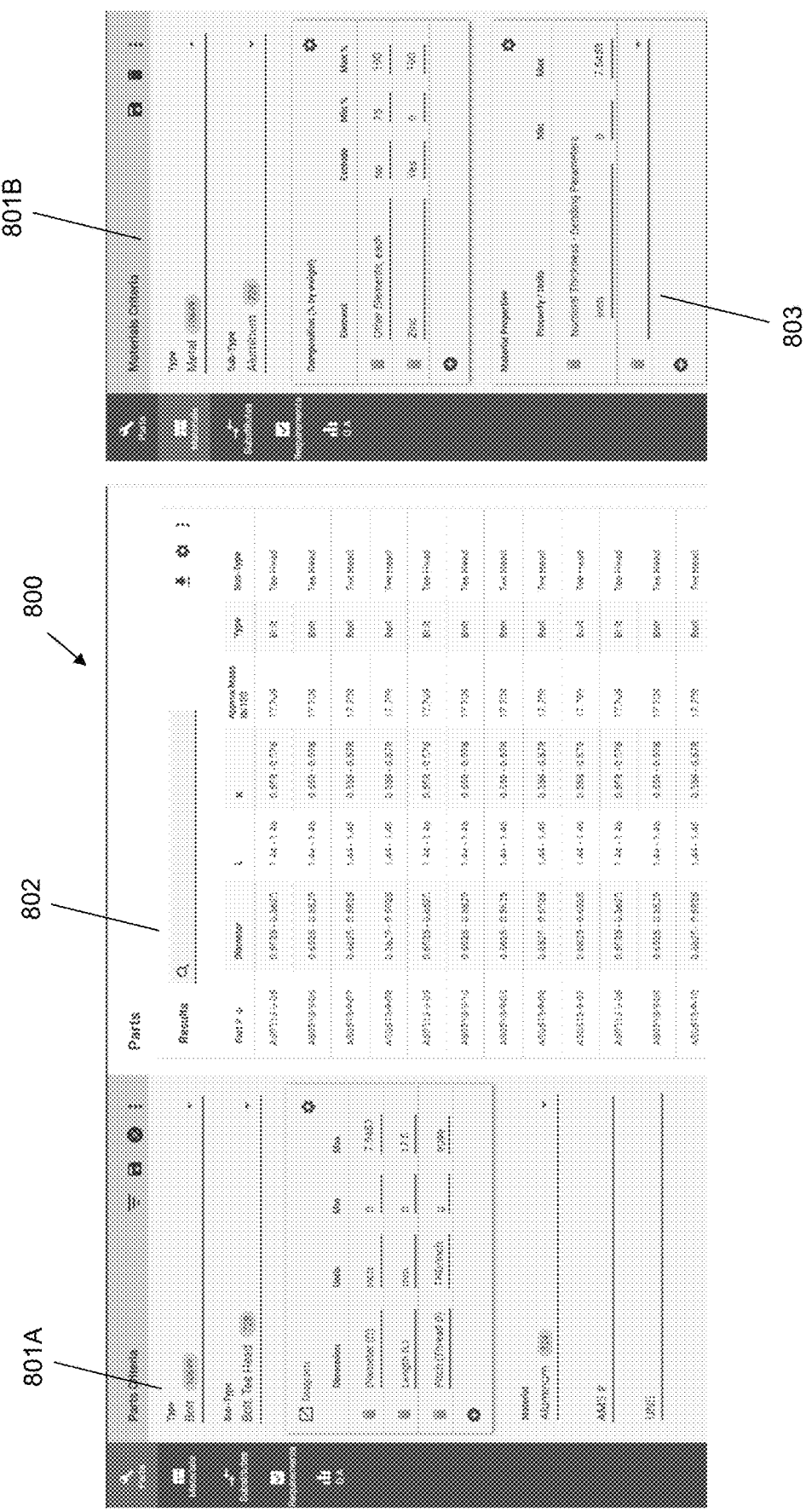
FIG. 8A illustrates an example of a digital standards search and filtering functionality without access to relational datasets.
FIG. 8B illustrates an example of a digital standards search and filtering functionality with access to relational datasets.

FIG. 8 illustrates an example of a digital standards search display 800. The input that can be provided within the search fields may be based upon the different databases or datasets that a particular user has access to. For example, 801A illustrates an example search section where the user only has access to the digital standards provided by the digital standards entity. On the other hand, 801B illustrates an example search section where the user has access to other relational databases or datasets, for example, internal databases, supplier databases, and the like. In this example, the user is provided with additional filter options 803 that allow the user to apply additional constraints or filters to the search information. For example, if the user has access to supplier databases, the user may wish to apply cost constraints to find objects that fall within a predetermined cost. As another example, if a user has access to a manufacturer database, the user may wish to apply a lead time constraint to find all objects that can be sourced within a predetermined time frame. Once all the search input and filters are provided, the system returns objects and, therefore, digital standards, that fulfill the search input and filter constraints. Thus, the search results correspond to the input provided within the search fields and are filtered based upon input provided within the filter fields.

Figure 9:
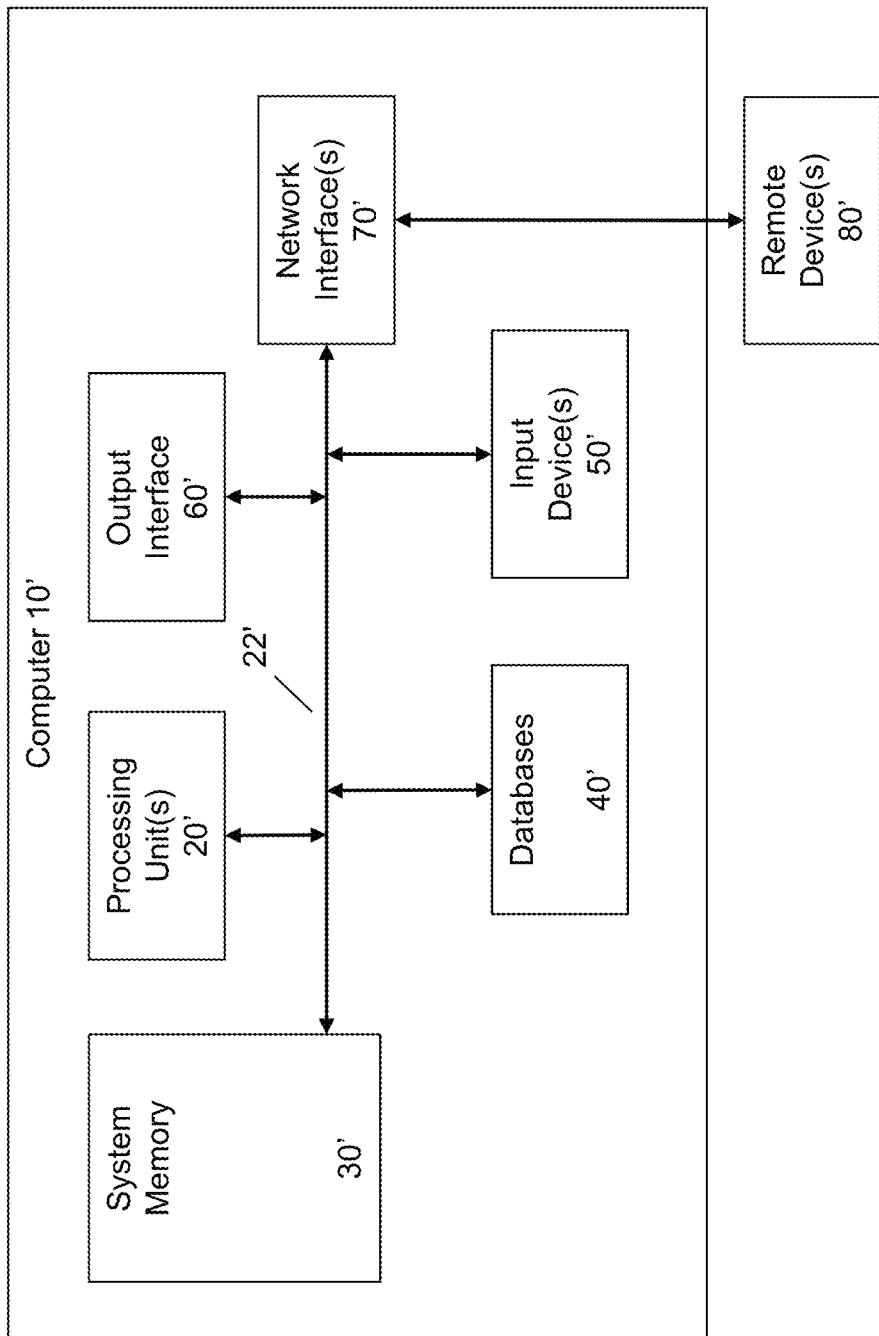
FIG. 9 illustrates an example of device circuitry.

While various other circuits, circuitry or components may be utilized in information handling devices, with a computer, server, client device or the like, an example device that may be used in implementing one or more embodiments includes a computing device in the form of a computer 10' as illustrated in FIG. 9. This example device may be a server used in one of the systems in a network, or one of the remote computers connected to the network. Components of computer 10' may include, but are not limited to, a processing unit 20', a system memory 30', and a system bus 22' that couples various system components including the system memory 30' to the processing unit 20'. Computer 10' may include or have access to a variety of computer readable media, including databases. The system memory 30' may include non-signal computer readable storage media, for example in the form of volatile and/or nonvolatile memory such as read only memory (ROM) and/or random access memory (RAM). By way of example, and not limitation, system memory 30' may also include an operating system, application programs, other program modules, and program data.

A user can interface with (for example, enter commands and information) the computer 10' through input devices 50' (e.g., keyboard, soft keyboard, mouse, auditory inputs, haptic inputs, gesture inputs, etc.). A monitor or other type of device can also be connected to the system bus 22' via an interface, such as an output interface 60'. The computer may include a database 40'. In addition to a monitor, computers may also include other peripheral output devices. The computer 10' may operate in a networked or distributed environment using logical connections to one or more other remote device(s) 80' such as other computers. The logical connections may include network interface(s) 70' to a network, such as a local area network (LAN), a wide area network (WAN), and/or a global computer network, but may also include other networks/buses.

Information handling device circuitry, as for example outlined in FIG. 9, may be used in client devices such as a personal desktop computer, a laptop computer, or smaller devices such as a tablet or a smart phone. In the latter cases, i.e., for a tablet computer and a smart phone, the circuitry outlined in FIG. 9 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 9 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for graphically displaying and interacting with digital standards, the method comprising:

providing a digital standard software application that accesses, from at least one data store, information corresponding to a plurality of digital standards, each of the plurality of digital standards comprising a digital format of an underlying standard formatted into a data structure and data model describing interactions and relationships of the underlying standard, wherein an underlying standard comprises a standard describing attributes of an object and being issued by an entity associated with the underlying standard, wherein the digital standard software application provides digital functionality allowing a user to interact with and view the plurality of digital standards, the digital functionality being facilitated via the digital format of the underlying standard, wherein the data structure and the data model provide a consistent format for the plurality of digital standards;

displaying, on an interactive display, a digital standard interface display corresponding to the digital standard software application, the digital standard interface display allowing for displaying and interacting with information corresponding to the at least one digital standard, wherein the digital standard interface display comprises a plurality of icons that are selectable by a user, the digital standard interface display being associated with the data structure and data model;

the digital standard interface display allowing a user to interact with the digital standard and make use of the digital functionality of the digital standard facilitated through the data structure and data model of the digital standard, wherein a displayed digital standard comprises one or more selectable links within the digital standard that, when selected, display other information of the digital standard;

wherein at least one of the plurality of icons comprises a standards category icon for displaying information related to digital standards within a category corresponding to the standards category icon;

displaying a digital standard selection field in response to a user selection of one of the standards category icons; and displaying, responsive to a user providing input to the digital standard selection field, information related to a digital standard identified from the provided input and of the category type corresponding to the selected standards category icon.

2. The method of claim 1, wherein at least one of the plurality of icons comprises a substitution icon, wherein user interaction with the substitution icon displays a substitution display, wherein the substitution display comprises at least one field for input of a digital standard identifier and at least one interactive table for selecting attributes related to the digital standard.

3. The method of claim 2, wherein the at least one interactive table provides drag-and-drop functionality for selecting a priority of the selected attributes.

4. The method of claim 1, wherein the displaying information related to a digital standard comprises displaying a display having a plurality of selectable tabs, each of the selectable tabs corresponding to an aspect of the digital standard.

5. The method of claim 4, wherein at least one of the selectable tabs comprises a sections tab; and
displaying, responsive to user selection of the sections tab, information from sections of an underlying standard identified from the provided input.

6. The method of claim 5, comprising highlighting, within the displayed information from sections of the underlying standard, requirements included within the section.

7. The method of claim 4, wherein at least one of the selectable tabs comprises a requirements tab; and
displaying, responsive to user selection of the requirements tab, information identifying requirements corresponding to an underlying standard identified from the provided input.

8. The method of claim 7, comprising displaying, within the displayed information identifying requirements, a category of each of the requirements.

9. The method of claim 4, wherein the displaying information comprises displaying at least one table within a display corresponding to one of the selectable tabs, wherein the at least one table comprises an aggregation of information from multiple table sources within an underlying standard.

10. The method of claim 1, wherein the displaying information comprises displaying at least one alert indicator, wherein user selection of one of the at least one alert indicators sets an alert for the user to be notified of changes to the information associated with the alert indicator.

11. The method of claim 1, wherein the displaying information comprises displaying at least one hyperlink for a selectable element within the displayed information; and
displaying, responsive to user selection of the at least one hyperlink, an overlay display displaying the information represented by the selectable element.

12. The method of claim 1, wherein the displaying information comprises displaying revision history information corresponding to at least one portion of the displayed information, wherein the revision history information identifies a source of a revision corresponding to the revision history information.

13. The method of claim 1, wherein the digital standard selection field comprises a search field; and
displaying at least one filter field, wherein the at least one filter field allows for filters based upon a set of relational databases associated with the user; and
wherein the displaying information comprises displaying at least one digital standard corresponding to input provided within the search field and filtered based upon input provided to the at least one filter field.

14. A system for graphically displaying and interacting with digital standards, comprising:
one or more processors;
a memory device that stores instructions executable by the processor to:
provide a digital standard software application that accesses, from at least one data store, information corresponding to a plurality of digital standards, each of the plurality of digital standards comprising a digital format of an underlying standard formatted into a data structure and data model describing interactions and relationships of the underlying standard, wherein an underlying standard comprises a standard describing attributes of an object and being issued by an entity associated with the underlying standard, wherein the digital standard software application provides digital functionality allowing a user to interact with and view the plurality of digital standards, the digital functionality being facilitated via the digital format of the underlying standard, wherein the data structure and the data model provide a consistent format for the plurality of digital standards;
display, on an interactive display, a digital standard interface display corresponding to the digital standard software application, the digital standard interface display allowing for displaying and interacting with information corresponding to the at least one digital standard, wherein the digital standard interface display comprises a plurality of icons that are selectable by a user, the digital standard interface display being associated with the data structure and data model;
the digital standard interface display allowing a user to interact with the digital standard and make use of the digital functionality of the digital standard facilitated through the data structure and data model of the digital standard, wherein a displayed digital standard comprises one or more selectable links within the digital standard that, when selected, display other information of the digital standard;
wherein at least one of the plurality of icons comprises a standards category icon for displaying information related to digital standards within a category corresponding to the standards category icon;
display a digital standard selection field in response to a user selection of one of the standards category icons; and
display, responsive to a user providing input to the digital standard selection field, information related to a digital standard identified from the provided input and of the category type corresponding to the selected standards category icon.

15. The system of claim 14, wherein at least one of the plurality of icons comprises a substitution icon, wherein user interaction with the substitution icon displays a substitution display, wherein the substitution display comprises at least one field for input of a digital standard identifier and at least one interactive table for selecting attributes related to the digital standard.

16. The system of claim 14, wherein the displaying information related to a digital standard comprises displaying a display having a plurality of selectable tabs, each of the selectable tabs corresponding to an aspect of the digital standard, wherein at least one of the selectable tabs comprises a sections tab; and
displaying, responsive to user selection of the sections tab, information from sections of an underlying standard identified from the provided input.

17. The system of claim 14, wherein the displaying information related to a digital standard comprises displaying a display having a plurality of selectable tabs, each of the selectable tabs corresponding to an aspect of the digital standard, wherein at least one of the selectable tabs comprises a requirements tab; and displaying, responsive to user selection of the requirements tab, information identifying requirements corresponding to an underlying standard identified from the provided input.

18. The system of claim 14, wherein the displaying information comprises displaying at least one alert indicator, wherein user selection of one of the at least one alert indicators sets an alert for the user to be notified of changes to the information associated with the alert indicator.

19. The system of claim 14, wherein the displaying information comprises displaying at least one hyperlink for a selectable element within the displayed information; and displaying, responsive to user selection of the at least one hyperlink, an overlay display displaying the information represented by the selectable element.

20. A product for graphically displaying and interacting with digital standards, comprising:

a storage device that stores code, the code being executable by one or more processors and comprising:

code that provides a digital standard software application that accesses, from at least one data store, information corresponding to a plurality of digital standards, each of the plurality of digital standards comprising a digital format of an underlying standard formatted into a data structure and data model describing interactions and relationships of the underlying standard, wherein an underlying standard comprises a standard describing attributes of an object and being issued by an entity associated with the underlying standard, wherein the digital standard software application provides digital functionality allowing a user to interact with and view the plurality of digital standards, the digital functionality being facilitated via the digital format of the underlying standard, wherein the data structure and the data model provide a consistent format for the plurality of digital standards;

code that displays, on an interactive display, a digital standard interface display corresponding to the digital standard software application, the digital standard interface display allowing for displaying and interacting with information corresponding to the at least one digital standard, wherein the digital standard interface display comprises a plurality of icons that are selectable by a user, the digital standard interface display being associated with the data structure and data model;

the digital standard interface display allowing a user to interact with the digital standard and make use of the digital functionality of the digital standard facilitated through the data structure and data model of the digital standard, wherein a displayed digital standard comprises one or more selectable links within the digital standard that, when selected, display other information of the digital standard;

wherein at least one of the plurality of icons comprises a standards category icon for displaying information related to digital standards within a category corresponding to the standards category icon;

code that displays a digital standard selection field in response to a user selection of one of the standards category icons; and code that displays, responsive to a user providing input to the digital standard selection field, information related to a digital standard identified from the provided input and of the category type corresponding to the selected standards category icon.

\* \* \* \* \*